Jan. 1, 1935. H. M. JOHNSTON 1,986,729
GAUGE
Filed Feb. 25, 1933 4 Sheets-Sheet 2
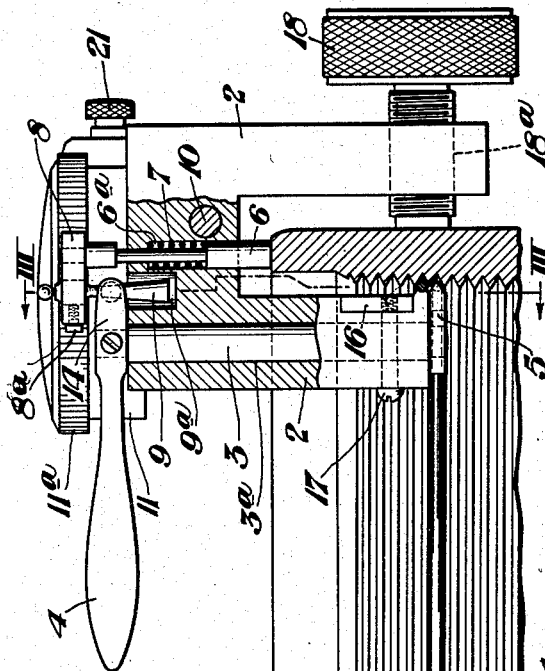
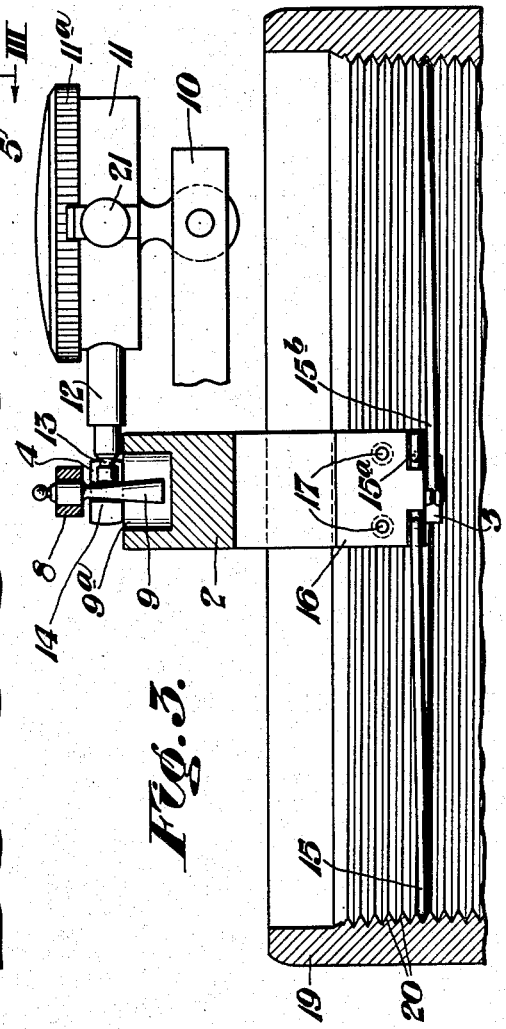
Inventor:
HARRY M. JOHNSTON,
by: Usina & Rauber
his Attorneys.

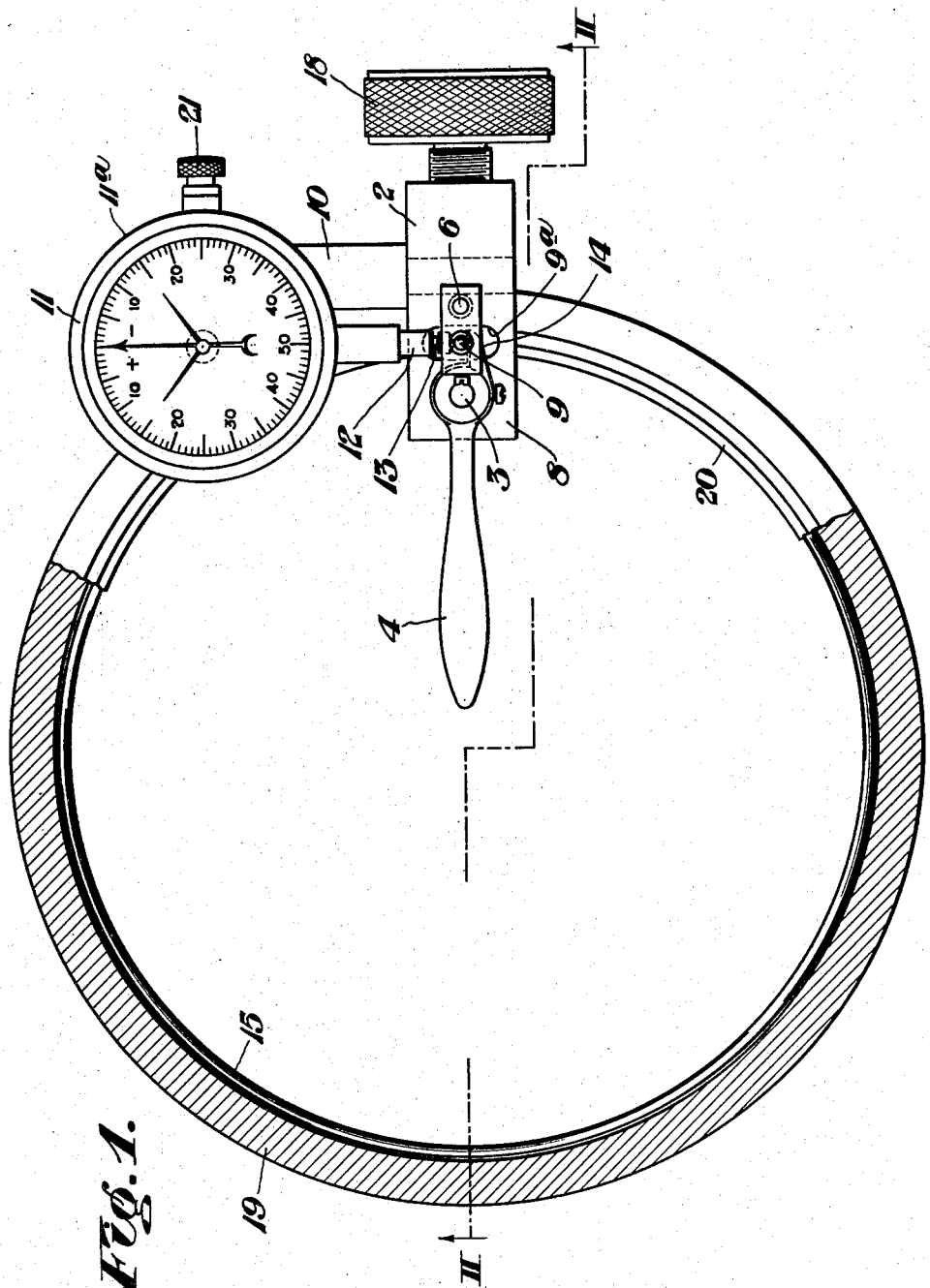

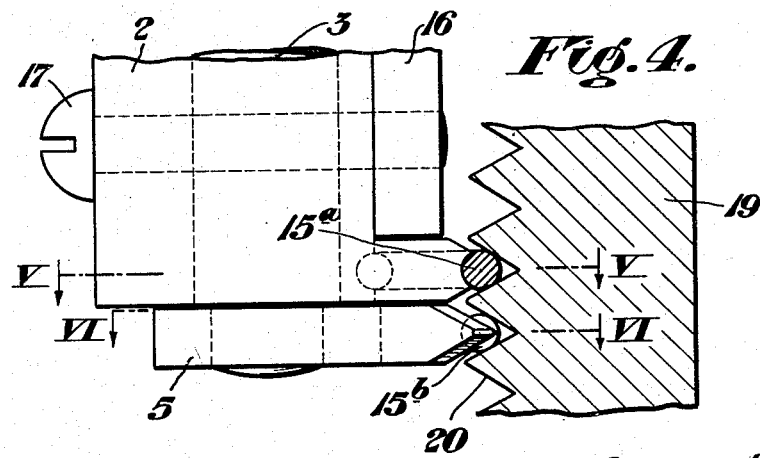
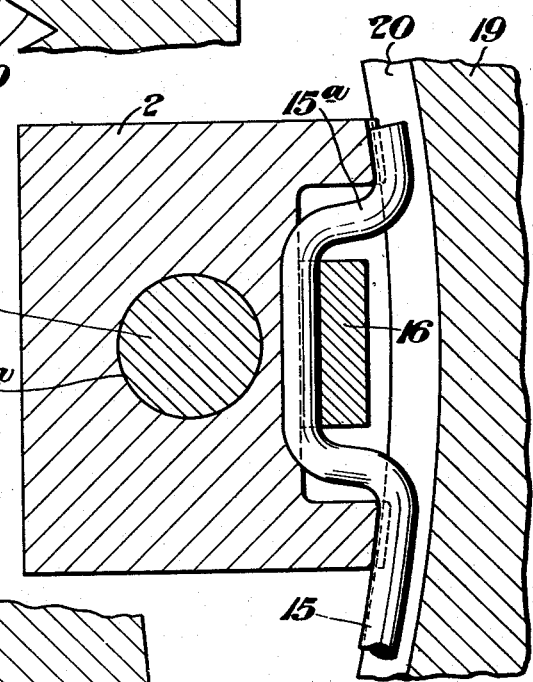
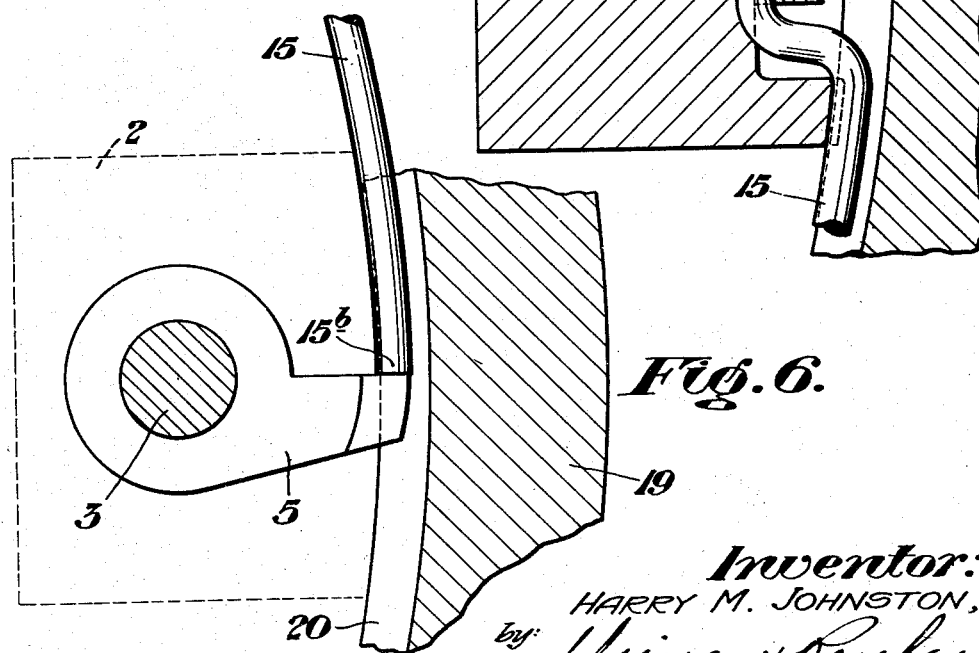

Jan. 1, 1935.   H. M. JOHNSTON   1,986,729
GAUGE
Filed Feb. 25, 1933   4 Sheets-Sheet 4
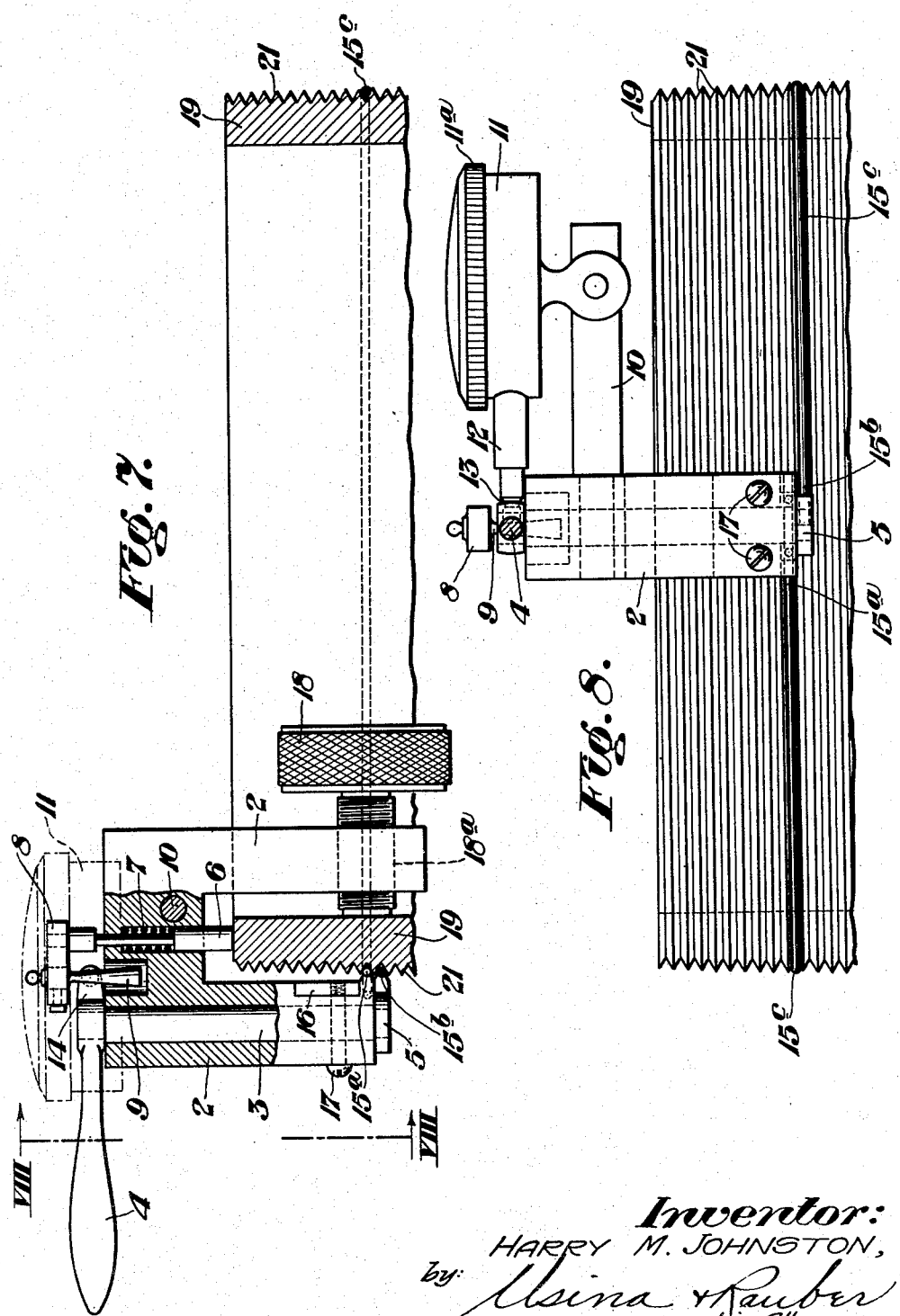
Inventor:
HARRY M. JOHNSTON,
by Usina & Rauber
his Attorneys.

Patented Jan. 1, 1935

1,986,729

UNITED STATES PATENT OFFICE 1,986,729

GAUGE

Harry M. Johnston, McKeesport, Pa., assignor to National Tube Company, a corporation of New Jersey Application February 25, 1933, Serial No. 658,619

6 Claims. (Cl. 33—179)

This invention relates to improvements in gauges, and particularly to that type of gauge employed to measure the internal and external thread pitch diameters of a work-piece, such as a pipe or pipe coupling.

One object of the invention is to provide a novel gauge having a removable element to permit of its use on various sizes and diameters of tubular work-pieces, such as commercial pipes or pipe couplings having straight or tapered walls and threaded surfaces.

Another object is to provide a gauge having a novel means to indicate the error in diameter of a tapered wall work-piece, and particularly those having internal and/or external threads.

These and further objects will be apparent after referring to the drawings, in which:

Figure 1 is a plan view of the apparatus of the invention used in connection with an internally threaded work-piece.

Figure 2 is a sectional elevation taken on the line II—II of Figure 1.

Figure 3 is a sectional elevation taken on the line III—III of Figure 2.

Figure 4 is a detail view of part of the apparatus of the invention.

Figure 5 is a sectional detail view taken on the line V—V of Figure 4.

Figure 6 is a detail view taken on the line VI—VI of Figure 5, and shown partly in section.

Figure 7 is a view similar to Figure 2, but showing the invention as used to gauge an externally threaded work-piece.

Figure 8 is a sectional elevation taken on the line VIII—VIII of Figure 7.

Referring more particularly to the drawings, the numeral 2 indicates an inverted U-shaped frame for the apparatus of the invention. A rotatable vertical shaft 3 is journaled in and extends through a hole 3ª in one of the legs formed by the frame 2 and has secured at one of its ends a lever 4 and at the other end thereof a cam 5 in operative relationship. The midportion of the frame 2 carries a plunger 6, disposed in a recess 6ª therein, which is held at its lowermost position by means of a spring 7. A yoke 8 is connected to the upper end of the plunger 6 and adjustably supports a wedge-shaped metering pin 9 by means of a setscrew 8ª. The metering pin 9 is tapered to correspond with the taper of a work-piece and is adapted to move vertically and horizontally in the recess 9ª in the body portion of the frame 2.

An extension 10 is attached to the frame 2 and supports a conventional gauge 11 provided with the usual dial and needle. The gauge 11 is provided with a tube 12 in which there is disposed a rod 13 for actuating the needle of the gauge. The lever 4 is provided with a heel 14 which is adapted to contact with one side of the wedge-shaped metering pin 9, and the actuating rod 13 for the gauge 11 is adapted to contact with the opposite side of the metering pin.

A comparatively circular wire 15 is secured at one of its ends, 15ª, to the frame 2 by means of a clamp 16 and its associated screws 17, which are disposed on the frame adjacent the cam 5. The wire 15 is adapted to expand naturally to contact with the inner surfaces of a tubular work-piece, such as the pitch diameter of an internal thread, and to make contact at its loose end 15ᵇ with the cam 5.

A thumbscrew 18 is disposed with its threaded portion in a correspondingly threaded hole 18ª in the frame 2 for securing the gauge to a pipe coupling 19, which is shown as having a tapered and internally threaded portion 20.

The gauge 11 is provided with a knurled bezel 11ª for rotating the dial of the gauge relatively to its cooperating needle, and a lock screw 21.

In operation, the frame 2 of the gauge is secured to a standard internally threaded master gauge by means of the thumbscrew 18. The wire 15, having been secured at one of its ends 15ª to the frame 2 by means of the clamp 16, is seated in the pitch diameter of an internal thread and the loose end 15ᵇ made to contact with the cam 5. The lever 4 is moved to expand the wire into the thread and to indicate the internal diameter thereof through the pressure of the heel 14 of the lever 4 which contacts with the wedge-shaped metering pin 9 which, in turn, moves the gauge rod 13. The gauge rod 13, of course, moves a needle to indicate the thread diameter of the master gauge on the dial of the gauge 11. The dial is rotated by the bezel 11ª in order to bring zero on the dial to the point of the arrow, and is locked in position by the screw 21, after which the gauge is removed.

The gauge is then placed on an internally threaded pipe coupling 19, of a diameter supposedly corresponding with that of the master gauge. The wire 15 is placed in a thread and expanded by means of the lever 4, moving the gauge-actuating rod 13.

It will be seen that as the position of the zero of the dial indicates the diameter of the thread of the master gauge a greater or less diameter of the thread of the work-piece will cause the needle to fall or rise from the zero mark and thus indicate the variance.

The plunger 6, working against the spring 7, will cause the yoke 8 to rise and fall in accordance with the depth the wire is placed in either the master gauge or the work-piece, and actuate the metering pin 9 to compensate for the taper in the work-piece by enabling a direct contact with the gauge rod 13.

Referring to Figures 7 and 8 of the drawings, the invention is shown as used for gauging external diameters. A wire 15$^c$, which is adapted to contract naturally and seek its smallest diameter, is substituted for the expanding wire 15.

The frame 2 of the gauge is clamped to a pipe 19, having a tapered externally threaded portion 21, by means of the thumbscrew 18. The wire 15$^c$ is placed in the pitch diameter of a thread and the lever 4 is moved to make the cam 5 contact with the free end 15$^b$ of the wire. The diameter of the external thread will be indicated on the dial of the gauge 11 by the function of the apparatus previously described.

While I have shown and described several specific embodiments of my invention it will be understood that I do not wish to be limited exactly thereto, since various modifications may be made without departing from the scope of my invention, as defined in the following claims.

I claim:

1. A gauge comprising a frame, a looped wire having one of its ends secured to said frame, a shaft extending through said frame, a cam on one end of said shaft for contacting the loose end of said wire, a lever on the other end of said shaft for expanding said looped wire, and measuring media in operative engagement with said lever.

2. A gauge comprising a frame, a looped wire having one of its ends secured to said frame, a shaft extending through said frame, a cam on one end of said shaft for contacting the loose end of said wire, a lever on the other end of said shaft, a heel on said lever, a gauge on said frame, an actuating pin for said gauge, a metering pin disposed between said actuating pin and the heel on said lever and means for regulating said metering pin.

3. A gauge comprising a frame, a looped wire having one of its ends secured to said frame, a shaft extending through said frame, a cam on one end of said shaft for contacting the loose end of said wire, a lever on the other end of said shaft, a heel on said lever, a dialed gauge on said frame, an actuating pin for said gauge disposed adjacent the heel on said lever, a metering pin disposed between said actuating pin and the heel of said lever and spring restrained means for automatically regulating said metering pin to continuously contact the heel of said lever and said actuating pin.

4. A gauge comprising a frame, a shaft extending through said frame, a cam on one end of said shaft, a lever on the other end of said shaft, a heel on said lever, said frame having a recess, a spring pressed plunger in said recess, a yoke secured to one end of said plunger, a metering pin secured to said yoke and adapted to contact with the heel of said lever on one of its sides, a dialed gauge mounted on said frame and having an actuating pin in contact with the other side of said metering pin, extraneous means for rotating the dial of said gauge, a looped wire having one of its ends clamped to said frame adjacent said cam, the loose end of said wire being adapted to contact said cam, and means for clamping said frame to a work-piece.

5. A gauge comprising a frame, a shaft extending through said frame, a cam on one end of said shaft, a lever on the other end of said shaft, a heel on said lever, said frame having a recess, a spring pressed plunger in said recess, a yoke secured to one end of said plunger, a metering pin secured to said yoke and adapted to contact with the heel of said lever on one of its sides, a gauge having a dial mounted on said frame and provided with an actuating pin in contact with the other side of said metering pin, means for rotating the dial of said gauge, a looped wire having one of its ends clamped to said frame adjacent said cam, the loose end of said wire being adapted to contact said cam, and means for clamping said frame to a work-piece.

6. A gauge comprising a frame, a looped wire having one of its ends secured to said frame, a shaft extending through said frame, a cam on one end of said shaft for contacting the loose end of said wire, a lever on the other end of said shaft for expanding said looped wire, measuring media in operative engagement with said lever, and means between said lever and said measuring media for compensating for a taper on the surface of a work-piece to be gauged.

HARRY M. JOHNSTON.